United States Patent [19]
Iwaisako et al.

[11] 3,875,048
[45] Apr. 1, 1975

[54] REFORMING PROCESS USING PLATINUM-LEAD-THIRD COMPONENT CATALYST AND CATALYST THEREFOR

[75] Inventors: Toshyyuki Iwaisako; Kusuo Ohki, both of Saitamaken; Naoya Kominami; Hisao Yomogida, both of Tokyo, all of Japan

[73] Assignee: Asahi Kasei Kogyo Kabushiki Kaisha, Osaka, Japan

[22] Filed: June 30, 1972

[21] Appl. No.: 268,140

[30] Foreign Application Priority Data
July 5, 1971 Japan.............................. 46-48789

[52] U.S. Cl............................... 208/139, 252/441
[51] Int. Cl...................... C10g 35/06, B01j 11/78
[58] Field of Search...................... 208/139; 252/441

[56] References Cited
UNITED STATES PATENTS

| | | | |
|---|---|---|---|
| 3,607,728 | 9/1971 | Wilhelm............................ | 208/111 |
| 3,649,565 | 3/1972 | Wilhelm...................... | 252/466 PT |
| 3,700,588 | 10/1972 | Weisang et al. ..................... | 208/139 |
| 3,705,111 | 12/1972 | Wilhelm............................ | 252/441 |
| 3,761,426 | 9/1973 | Wilhelm............................ | 208/139 |
| 3,770,616 | 11/1973 | Kominami et al. ................. | 208/138 |
| 3,827,971 | 8/1974 | Kominami et al. ................. | 208/139 |
| 3,827,972 | 8/1974 | Kominami et al. ................. | 208/138 |
| 3,830,726 | 8/1974 | Weisang et al. ..................... | 208/138 |

OTHER PUBLICATIONS
Maatman, "How to Make a More Effective Platinum-Aluminum Catalyst," Industrial and Engineering Chemistry, August, 1959, Vol. 51, No. 8, pp. 913–914.

Primary Examiner—Delbert E. Gantz
Assistant Examiner—S. Berger
Attorney, Agent, or Firm—Armstrong, Nikaido & Wegner

[57] ABSTRACT

A method for reforming hydrocarbons which gives various advantages such as higher yield of aromatics, higher concentration of aromatics during the reforming operation, products of higher octane value, lower catalyst cost, etc. is given by using a catalyst containing 0.01 - 2 percent by weight of platinum and 0.01 - 5 percent by weight of lead as essential components and 0.01 - 5 percent by weight of an optional third component, the weight ratio of lead to platinum in the catalyst being 0.1 - 3:1, and the preparation of the catalyst comprising impregnating a carrier with a hydrochloric acid solution of a platinum compound, a solution of a lead compound and a solution of a compound corresponding to the optional third component, in any order, and calcining the resulting impregnated mass at a temperature of 570° - 1470°F. Alternatively, said lead component or third component can be supported on a carrier by co-precipitating or co-gelating a compound corresponding to the component and a compound corresponding to the carrier.

14 Claims, 2 Drawing Figures

REFORMING PROCESS USING PLATINUM-LEAD-THIRD COMPONENT CATALYST AND CATALYST THEREFOR

BACKGROUND OF THE INVENTION

1. Field of the Invention

This invention relates to a method for reforming hydrocarbons in contact with an improved catalyst containing platinum and lead or platinum, lead and a third component. More particularly it relates to a method for reforming hydrocarbons by using a catalyst containing platinum, lead and optionally a third component, prepared by impregnating a carrier with a hydrochloric acid solution of a platinum compound, a solution of a lead compound and optionally a solution of a compound corresponding to the third component. Alternatively, said lead component or third component can be supported on a carrier by coprecipitation or cogelation with a compound corresponding to the carrier.

2. Description of the Prior Art

Catalytic reforming is a process by which hydrocarbons rich in high octane aromatics are produced by treating low octane value straight-run naphtha.

As reforming catalysts, platinum-alumina catalysts are mostly used. Since the announcement of Platforming by U.O.P. in 1949, such reforming processes as Houdriforming, Ultraforming, Sovaforming, Powerforming, etc. have been successively put into practice and recently Rheniforming which utilizes platinum-rhenium-alumina catalyst, has been commercialized.

We had studied the catalysts used in these processes in order to improve their performance and as the result of this comprehensive study, we found that lead gives epoch-makingly excellent effect and completed several prior inventions, the detail of which are disclosed in Japanese patent application Nos. 9488/69, 10381/69, 40914/70, 11095/70, Dutch Patent laid open No. 7,001,852 West German Patent laid open No. 2,005,828, French Patent No. 2,030,396, Chemical Abstract, Vol. 73, 132757U (1970), etc. These inventions are concerned with methods which have overcome some of the disadvantages of platinum-alumina catalysts. That is, increases in aromatics yield, reformate yield, hydrogen yield, octane value, etc., control of deactivation rate due to the deposit of carbonaceous materials, etc. have been attained, and the reaction under a lower pressure, particularly lower than 300 p.s.i.g. has been made thereby advantageous. It had been a generally admitted fear for the reforming industry that incorporation of lead into platinum becomes a cause of poison, but it has become clear, on the other hand, that a certain limited proportion of lead to platinum is, on the contrary, effective, and this is the basis of the prior inventions.

As mentioned above, the effect of a component other than platinum and carrier, upon platinum, has drawn the public attention from the viewpoint of the social requirement. First of all, by the popularization of motorization, the octane value of gasoline required in the market as a fuel oil, has been ever increasing and the technical solution for this trend cannot be carried out without resorting to the progress of reforming because processes which provide other blend stocks, such as catalytic cracking, alkylation, isomerization, polymerization etc., have limitation in the points of octane value, distillation property and sources.

In the second place, the industries which utilize benzene, toluene, xylene, heavy aromatics, etc., are rapidly expanding and the increase in the yield of aromatics is very desirous. Thus in order to satisfy these requirements, the development of a catalyst which shows advantages under a low pressure has been pursued, and in this field, tin (West German Patent laid open No. 2,038,791, French Patent No. 2,011,873) and germanium (West German Patent laid open No. 202,537, Japanese Patent laid open No. 2082/1971) have been proposed as a promoter of platinum beside the above-mentioned rhenium and lead.

In addition, attempts to increase the activity without the aid of a component other than platinum and carrier, by the improvement of the preparation method of platinum-alumina catalyst were made. For example attempts to prepare a catalyst in the presence of a salt or an acid were made by V. Haensel (U.S.P. 2,840,532), R.W. Maatman (Industrial and Engineering Chemistry) (Vol. 51, No. 8, P 913-914, 1959), etc. They reported that the dispersion degree of platinum could be thereby improved. Further, various catalysts prepared by having hydrochloric acid adsorbed to a carrier in advance have been proposed but these have nothing to do with the present invention.

SUMMARY OF THE INVENTION

It is an object of the present invention to provide a method for reforming hydrocarbons in which a catalyst containing platinum and lead is used as in the prior inventions but the advantages of the prior inventions are further enhanced and further new advantages are gained.

Another object of the present invention is to provide a method for preparing an improved catalyst containing platinum and lead.

As for the enhancement of the advantage of prior inventions, there can be mentioned the increase in the yield of aromatics. It has been found that 3 to 5 percent higher yield can be obtained. Since the rate of deactivation is almost the same with that of the prior inventions, the above-mentioned difference in yield can be maintained at any stage of reaction time.

As for the new advantage, there can be mentioned the higher aromatic concentration in the reformate and the higher octane value thereof.

This feature, for example, enables to realize the advantage that the content of any component other than aromatics in the fractions having boiling points higher than that of toluene can be made almost zero, even when reforming is carried out under conventional commercial conditions by using a naphtha of Middle East origin. Of course, the pattern of products varies according to the reaction conditions. For example, when the space velocity is exceedingly large, this results in fractions having boiling points higher than that of toluene which contain a large amount of unreacted paraffins. However, under the conditions in the vicinities of 2 - 3 $hr^{-1}$ of LHSV and 900°F of reaction temperature, the effectiveness of the present invention is well exhibited, toluene, xylene, trimethylbenzene, etc. can be obtained cheaply and extraction of aromatics can be saved.

Another new advantage is the reduction in the cost of catalyst. According to the present invention, even when the amount of the platinum component is reduced by 40 percent, the same activity as that of the prior inventions can be maintained, and even when the platinum content is reduced to 50 percent of that of the conventional catalysts, the resultant catalyst of the present invention still has a higher activity than that of the conventional catalysts. The term "higher activity" referred to herein means that reformate ($C_5^+$) yield, aromatics yield, hydrogen yield, octane value, etc. are higher and life is longer.

For example, the catalyst of the present invention having a composition of 0.3 percent by weight of platinum and 0.3 percent by weight of lead supported on $Al_2O_3$ has almost the same activity as that of the catalyst of the prior invention having a composition of 0.5 percent by weight of platinum and 0.5 percent by weight of lead supported on $Al_2O_3$, and has a higher activity than the conventional catalyst having a composition of 0.6 percent by weight of platinum supported on $Al_2O_3$. Such a higher activity of the catalyst of the present invention can be utilized in the production of a catalyst containing a smaller amount of platinum, increase in space velocity, reduction in the frequency of regeneration, etc. in commercial operation, and inexpensive reformate can be produced by the above-mentioned advantage.

Exact elucidation has not been made yet as to by what kind of functional mechanism the effectiveness of the catalyst of the present invention is exhibited, but according to our finding, it is assumed that a relative state of platinum and lead components supported on a carrier is the cause of the effectiveness.

From our several prior inventions, we have clarified that the optimum ratio of lead to platinum charged into the catalyst varies according to the conditions of preparation. The reason for it lies in that the state of distribution of both the components of platinum and lead thus varies according to the preparation method and if the ratio of lead to platinum at the time of actual function exceeds 3, the catalytic components melt under the reaction conditions of reforming and act as a poison. The above-mentioned fact is anticipated naturally from the phase diagram of Pt-Pb system.

On the other hand, it has become clear that when a catalyst is prepared according to a common impregnation method, points where the ratio of Pb to Pt exceeds 3 occur in the part where both the components are existent, even when the ratio of Pb to Pt charged is less than 3.

These catalysts to be examined were prepared by breaking extrudates having one-sixteen inch diameter. The relative intensities of each component were plotted by scanning the broken surface of the catalyst along a line passing from one surface to the broken surface through the center to the other surface thereof. By using Electron Probe Microanalyzer as a measuring instrument, characteristic X-rays of platinum, lead and chlorine were taken out by a spectrometer and detected.

Figure 1:
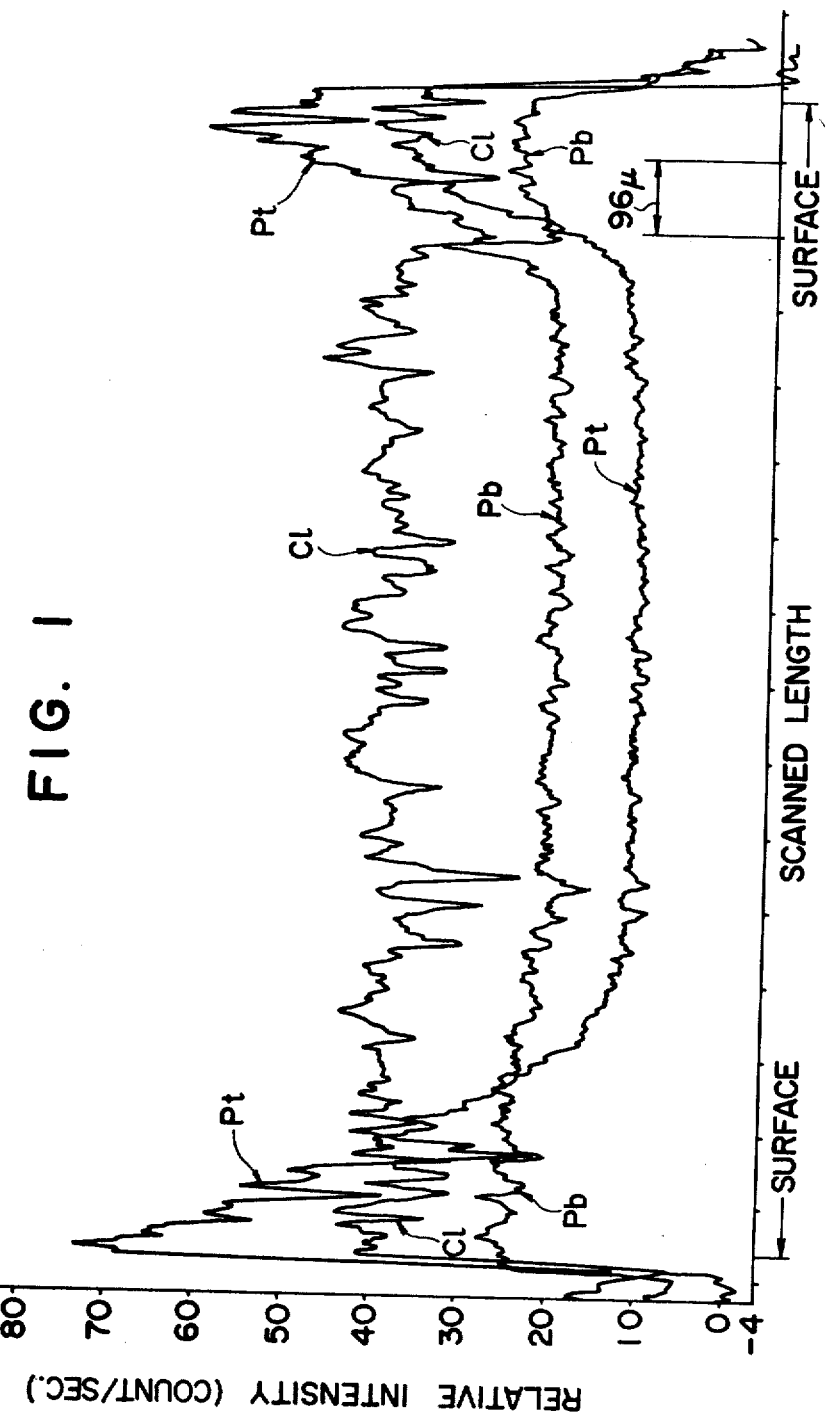
FIG. 1 is an X-ray spectrum chart showing a distributing state of platinum and lead in the catalyst of Comparative Example 1 where no hydrochloric acid was used in the preparation of the catalyst.
Figure 2:
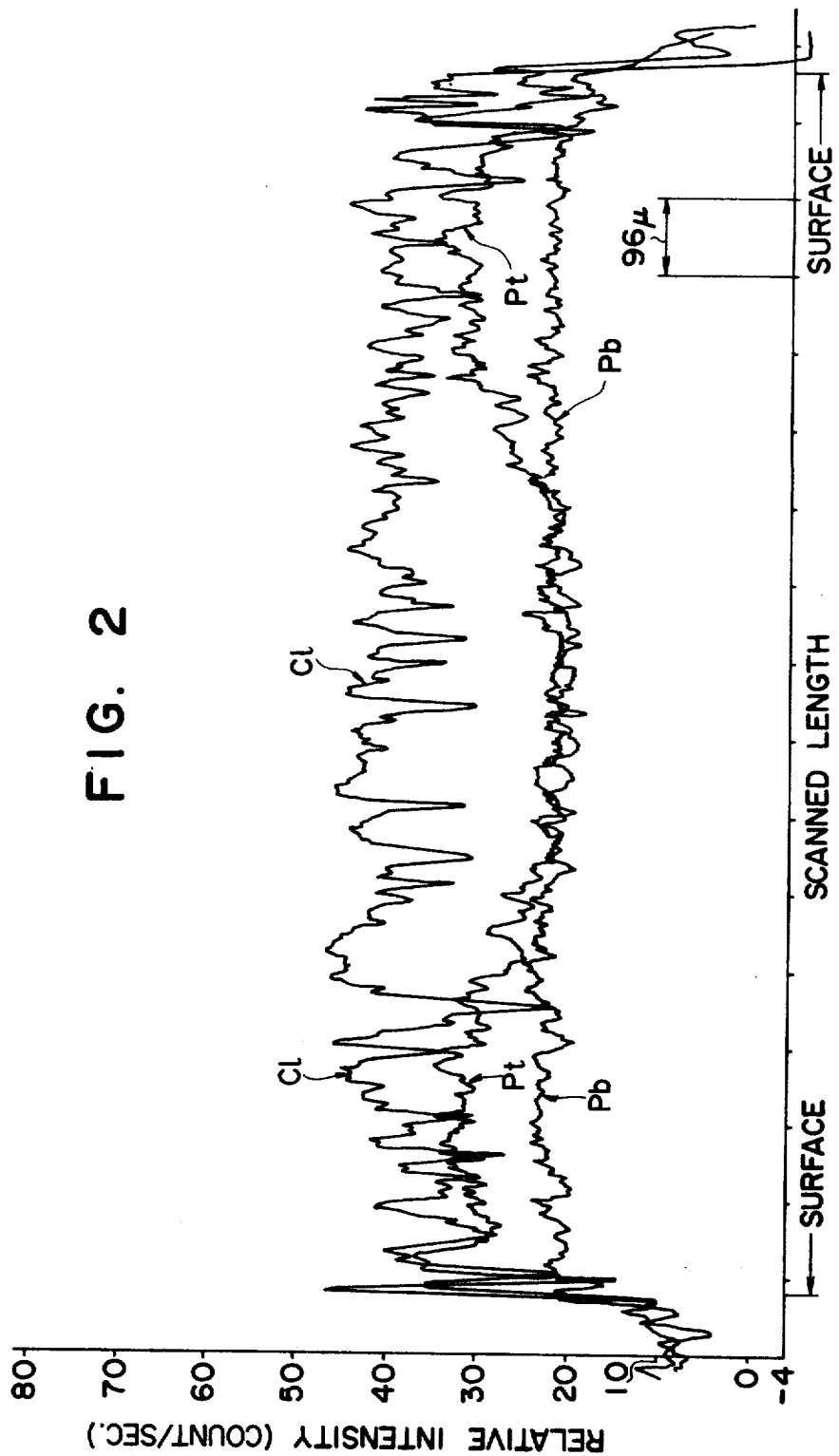
FIG. 2 is an X-ray spectrum chart showing a distributing state of platinum and lead in the catalyst of Example 1 where hydrochloric acid was used in the preparation of the catalyst.

Measuring conditions were as follows:
Voltage    25 KV
Sample Current    0.5 μA
Scanning Speed    96 μ/min
Chart Speed    20 mm/min.
Detection    Pt: $L_\alpha$
           Pb: $M_\alpha$
           Cl: $K_\alpha$ As shown in FIG. 1, the lead component is adsorbed down to the relatively deep part of carrier but the platinum component is adsorbed mostly in the part relatively close to the surface layer. It is assumed that this is due to the fact that the adsorption of lead component is weak but that of platinum component is strong. Accordingly, when a catalyst is prepared by adsorbing platinum through an impregnation, it is necessary to make the parts where platinum is coexistent with an excessive amount of lead as small as possible, by some means or others. With the above-mentioned object, effort has been made to find out an additive which may control the adsorptivity of platinum, and as a result, it has been found that the addition of hydrochloric acid at the time of adsorption of platinum on a carrier changes the adsorption properties of platinum and lead and makes the ratio of both the components optinum as shown in FIG. 2.

As above-mentioned there are many attempts made to change the distribution state of platinum. R.W. Maatman suggests the effectiveness of various salts or acids. However, it has been found that among various salts and acids, those which can improve the distribution state of platinum and lead and yet can increase the activity of catalyst, are rather limitative, and hydrochloric acid shows special effect. Such an effect has been achieved firstly only by the combination of platinum-lead-hydrochloric acid.

Most of the acids and salts recommended by R.W. Maatman and V. Haensel et al. may improve the distribution of platinum but are almost ineffective for the Pt-Pb system. There are known a considerable number of them which even reduce the activity of the catalyst. For example, ammonium chloride, aqueous ammonia, etc. show no effectiveness, acetic acid and nitric acid reduce the activity and hydrogen fluoride is not preferable because it increases hydrocarbon-decomposing activity. Thus the influence upon platinum-alumina system catalysts and that upon platinum-lead-alumina system catalysts are entirely different and there is no common regularily. Particularly, acetic acid gives fatal damage to platinum-lead-alumina system and unless halogen is fed, its activity cannot be recovered. Thus even when the distribution grade of platinum is improved, sufficient caution is necessary to the above-mentioned point.

Although hydrochloric acid increases the activity of platinum-lead-alumina system catalyst by the coexistence with platinum in an aqueous solution, it has been made clear by a comprehensive study that it does not increase the activity in all the reactions occurring in reforming. Namely, the reactions in which the activity is greatly increased as compared with the prior inventions, include isomerization of paraffin and cyclization-dehydrogenation. Decomposition activity is almost the same. On the other hand, the reactions in which the activity is slightly reduced include dehydrogenation of naphthenes. The characteristic feature of this reaction is shown in Example 14. However, this difference is so negligibly small that it cannot be detected unless a measurement is made at about LHSV=30 hr$^{-1}$. Moreover, the activity is far higher than the conventional platinum-alumina catalyst. The reaction rate of dehydrogenation of naphthene is much greater than those of other reactions as evident from a number of research reports, and so far as dehydrogenation activity alone is concerned, it will be practically sufficient with such an extent of activity as that of conventional catalyst. Accordingly, it can be said that the catalyst of the present invention does not show any disadvantage.

In the following table, the relations of the catalyst of the present invention to those of the prior inventions and to a conventional catalyst are shown. As evident from these relations, the effectiveness of the present invention cannot be derived or inferred from the past literatures and arts. It has been found from the detailed study of platinum-lead-alumina-system catalyst. It is surprising enough that aromatization of paraffins which has been considered to be most difficult, has been effectively carried out by the addition of lead which has been considered to be a poisonous material to platinum and by the aid of hydrochloric acid.

|  | CONVEN-TIONAL | prior invention | present invention |
|---|---|---|---|
| Catalyst system | Pt/Al$_2$O$_3$ | Pt-Pb/Al$_2$O$_3$ | Pt-Pb/Al$_2$O$_3$ |
| decomposition activity | large >> | small < | small |
| isomerization | small < | medium < | large |
| dehydrogenation of naphthenes | small << | large > | large |
| aromatization of paraffins | small << | large < | large |

The present invention resides in a method for reforming hydrocarbons by the use of a catalyst containing 0.01 – 2 percent by weight of platinum and 0.01 – 5 percent by weight of lead as essential components and 0.01 – 5 percent by weight of an optional third component, the weight ratio of lead to platinum in the catalyst being 0.1 – 3:1, and the preparation of the catalyst comprising impregnating a carrier with a hydrochloric acid solution of a platinum compound, a solution of a lead compound and a solution of a compound corresponding to the optional third component, in any order (including simultaneous impregnation), and calcining the resulting impregnated carrier at a temperature of 570° – 1470°F. Alternatively, said lead component or third component can be supported on a carrier by co-precipitating or co-gelating a compound corresponding to the component and a compound corresponding to the carrier.

As for the form of platinum used as a raw material for the catalyst components, hydroxide, halogenides such as chloride or hydrates of these compounds or ammonium salts of these compounds can be illustrated. A halogen-containing compound such as chloroplatinic acid is particularly recommended.

Similarly, as for a raw material for lead component, inorganic acid salts such as nitrates, chlorides, etc., organic acid salts, hydroxides, oxides, etc. are preferable.

It is preferable that the raw materials for both the components are soluble in water or an aqueous hydrochloric acid solution and they are not limited to the above-mentioned compounds.

A third component can be added optionally if it is necessary. It is at least one kind selected from the group consisting of lithium, sodium, potassium, ribidium, cesium, copper, silver, gold, beryllium, magnesium, calcium, strontium, barium, zinc, cadmium, mercury, yttrium, boron, thallium, titanium, zirconium, germanium, tin, vanadium, tantalum, phosphorus, antimony, bismuth, chromium, molybdenum, tungsten, manganese, rhenium, iron, cobalt, nickel, ruthenium, rhodium, palladium, osmium, iridium, thorium, uranium, etc.

The contents of platinum, lead, and a third component are respectively 0.01 – 2 percent by weight, 0.01 – 5 percent by weight, and 0.01 – 5 percent by weight per the weight of catalyst.

The most important factors for the addition of lead component are the above-mentioned amount to be added and the ratio of lead to platinum. particularly, this ratio is an essential condition for the lead to exhibit its effectiveness. In the present invention, this ratio should be in the range of 0.1 – 3. According to the variation of preparation method, more suitable individual ranges exist.

When this ratio lies outside this range, the effectiveness of hydrochloric acid is scarcely brought about. This is a phenomenon entirely different from that of platinum-alumina system catalyst.

Preferable amounts of platinum, lead and a third component and the ratios of these components are varied according to the preparation method.

The principal preparations of the catalyst of the present invention and the respective preferable ranges of the ratio of lead to platinum will be given hereinafter.

i. After allowing only the lead component to support on a carrier by a co-precipitation method or a co-gelation method, the platinum component is allowed to support on the resulting carrier by an impregnation method.

In this case, preferable weight percent of platinum and lead per catalyst and weight ratio of lead to platinum are 0.1 – 1 percent, 0.1 – 3 percent and 0.3 – 3, respectively, and 0.3 – 0.7 percent, 0.2 – 2 percent and 0.3 – 2.5, respectively, are particularly preferable.

ii. After allowing the lead component to support on a carrier by an impregnation method, the platinum component is further allowed to support on the resulting carrier successively by an impregnation method.

In this case, preferable weight percent of platinum and lead per catalyst and weight ratio of lead to platinum are 0.1 – 1 percent, 0.1 – 3 percent and 0.3 – 2.5, respectively, and 0.3 – 0.7 percent, 0.2 – 1.5 percent and 0.3 – 2, respectively, are particularly preferable.

iii. Lead and platinum are simultaneously supported on a carrier by an impregnation method.

In this case, preferable weight percent of platinum and lead per catalyst and weight ratio of lead to platinum are 0.1 – 1 percent, 0.1 – 2 percent and 0.3 – 2, respectively, and 0.3 – 0.7 percent, 0.2 – 1 percent and 0.3 – 1.5, respectively, are particularly preferable.

iv. After allowing the platinum component to support on a carrier by an impregnation method, the lead component is successively supported on the resulting carrier by an impregnation method.

In this case, preferable weigth percent of platinum and lead per catalyst and weight ratio of lead to platinum are 0.1 – 1 percent, 0.1 – 1.5 percent and 0.3 – 1.5, respectively, and 0.3 – 0.7 percent, 0.2 – 1.0 percent and 0.3 – 1.0, respectively, are particularly preferable.

The terms "co-gelation and co-precipitation methods" herein referred to are those in which a solution of a carrier component and a solution of active components are mixed and then allowed to gelatinize or precipitate. In the case of co-gelation, to a sol or a solution of a carrier component such as alumina, silica, silica-alumina, etc., a solution containing active components is added, and the resulting mixture is gelatinized by evaporation of solvent to dryness, spray drying or other customary means, or a pH controlling agent such as an acid, an alkali, etc. is added to cause gelation within a short period of time. In the precipitation method, active components are dissolved in a solution of a soluble compound of the carrier component, for example, if the carrier is alumina, an aqueous solution of aluminum chloride, or a solution of active components are added to the aqueous solution of aluminum chloride, and then both the components are precipitated by adding a neutralizing agent such as aqueous ammonia. An organic solvent, etc. can co-exit in the solution during the above-mentioned course. Any of the conventional, so called co-precipitation methods and co-gelation methods are included in the preparation of the catalyst of the present invention, which, however, should not be limited thereto.

The impregnation method comprises impregnating a solid carrier with a solution containing active components, allowing the active components to be adsorbed or absorbed, followed by drying. For drying, any of a method of evaporating a solvent to dryness and a method of drying after filtration, can be adopted.

The support of a third component on a carrier can be carried out simultaneously with that of platinum or lead, or the simultaneous support with the two components is also possible. It is also an effective method to make a carrier support a third component in advance before the support of other components.

It is essential to use hydrochloric acid simultaneously with platinum, and the effectiveness of the present invention can be exhibited when an aqueous hydrochloric acid solution of platinum is used at the time of the deposit of platinum in the above-mentioned methods (1) to (4). Accordingly, if hydrochloric acid is used only at the time of co-precipitation of lead in the method of (1) or only at the time of impregnation of lead solution in the methods of (2) and (4), or hydrochloric acid is adsorbed on a carrier in advance, then the effectiveness of the present invention cannot be exhibited as shown in Comparative Example 5. In such cases, only a slight change in the pattern of the products due to the increase in the chlorine content in the catalyst appears. Further, even if hydrochloric acid is fed in gaseous phase, no effectiveness is obtained.

Thus, in the method of the present invention, the object of using hydrochloric acid is not to introduce chlorine into a catalyst but just to increase the activity of catalyst by having influence upon the supporting characteristics of platinum and lead on a carrier.

The amount of hydrochloric acid to be used is in the range of 0.1 to 10 percent by weight per catalyst, preferably is in the range of 0.5 to 5 percent by weight. The use of more than 10 percent by weight of hydrochloric acid brings about no increase in effectiveness. However, the amount of hydrochloric acid herein referred to, is the amount to be used at the time of deposit of platinum on a carrier. In reality, the most of the amount used disappears by the calcination of catalyst. For example, if a catalyst is burnt at 1040°F, only 0.8 – 1.5 percent by weight of HCl per catalyst remains. In this amount, the amount supplied from chloroplatinic acid is nearly identical to the percent by weight of platinum.

The halogen content of the catalyst of the present invention is generally within the range of 0.1 – 3 percent by weight per catalyst although it varies depending on the conditions such as calcination temperature, addition of HCl, etc.

The concentration and amount of each component to be used, in its solution (usually, aqueous solution, also in the cases of the lead-component and the third component), can be properly selected according to the methods being usually carried out by persons skilled in the art. In short, the necessary amount of each catalytic component is decided according to such methods as filtration, evaporation to dryness, co-precipitation, etc., and the concentration is decided by optionally selecting the amount of liquid to be used. As for the amount of liquid, an amount of volume at least equal to the amount of catalyst is sufficient, which, however, has nothing to do with the present invention and is a generally common knowledge in the preparation of catalyst. For example, in the co-gelation method or the impregnation - evaporation to dryness method, an active component to be used is totally supported, while, in the impregnation-filtration method, the amount of an active component to be used is decided depending upon the impregnation conditions such as the amount of liquid, the temperature of liquid, the impregnating period of time, the physical properties of carrier, etc. which are decided according to the methods being usually carried out by persons skilled in the art. Namely, the active component can be also used in an amount not less than that necessary for the catalytic composition.

As for carriers, refractory inorganic materials such as alumina, silica, silica-alumina, zeolite, etc. are preferable. Hydroxides or hydrates of these compounds are also useful. Alumina is particularly suitable. As for the crystal structure, aluminas composed mainly of amorphous alumina, γ-alumina, θ-alumina, η-alumina or the like are superior. It is preferable that the specific surface area of carrier is 50 m$^2$/g or more and porosity (volume of pores) is 0.1 cm$^3$/g or more, but even when they are lower than the values above-defined, there will be no harmful effect upon the effectiveness of lead.

The catalyst on which the active components are deposited will turn into a form having a stabilized activity by calcining at 570°F to 1470°F, preferably at a 840°F to 1100°F. In the case where the support of the active components is carried out not simultaneously, calcination is usually carried out after each support of each component, but the intermediate calcination is not indispensable in the present invention and even when it is omitted, the effectivenesses of the present invention are not harmed. Accordingly, unless particularly indicated, the above-mentioned case where the support of the active components is carried out not simultaneously, includes both the case where the intermediate calcination is carried out and the case where it is not carried out. It is preferable that the calcining time is in the range of 30 minutes to 10 hours, preferably 1 – 5 hours.

As for hydrocarbons to be used as a raw material, any of paraffins, olefins, naphthenes and aromatics can be used and a sole compound or a mixture of these can be also used. In commercial operation, inexpensive raw materials such as naphtha, kerosene, gas oil or the like are convenient. Since the sulfur in a raw material becomes a temporary poison to a catalyst, the smaller the sulfur, the better the result. This is same with the case of a common catalyst. A connection with a desulfurizing plant is thus preferable.

The reforming method herein referred to means the treatment of a mixture of hydrocarbons and hydrogen on a catalyst and includes various proportions of dehydrogenation, cyclization dehydrogenation (aromatization), isomerization, dealkylation, hydrocracking, etc. depending upon the raw materials and reaction conditions. However, it will be apparent from the disclosure of specific examples that the improved catalyst of the present invention is advantageous particularly for the aromatics-forming reaction.

Mol ratio of hydrogen to hydrocarbons is in the range of 0.5 – 15, preferably 2 – 10 and particularly preferably 3 – 7.

It is effective for the improvement in the initial activity of catalyst to treat a catalyst with a hydrogen-containing gas in advance to activate it, before reaction is started.

Reaction temperature of 600°F to 1200°F, preferably 750°F to 1020°F is applicable.

It is suitable that the hydrocarbon feeding velocity (LHSV) is in the range of 0.2 – 10 $hr^{-1}$, preferably 0.5 – 5 $hr^{-1}$.

As for reaction pressure, a range of 0 – 700 p.s.i.g. is useful but a range of 0 – 300 p.s.i.g. is effective, and a range of 70 – 200 p.s.i.g. is particularly advantageous.

It is preferable to determine a value of LHSV according to a pressure. For example, it is possible to change LHSV to 0.2 to 1 at the atmospheric pressure, to 2 – 4 at 140 p.s.i.g. and to 3 – 5 at 300 p.s.i.g.

Since the catalyst of the present invention can be used advantageously at a lower pressure, economical profit will become greater when the catalyst is used in Swing process of repeating reaction and regeneration.

EXAMPLE 1

An aqueous solution in which the contents of Pt, Pb and HCL are 0.25 percent, 0.25 percent and 0.5 percent each by weight, respectively, was prepared by using chloroplatinic acid, lead nitrate and conc. hydrochloric acid (37 percent conc.). 99 g of γ-alumina carrier was impregnated with 200 cc of the aqueous solution. After evaporation to dryness, the calcination was carried out at 1020°F for 3 hours. The composition of the resulting catalyst was 0.5 percent Pt - 0.5 percent Pb - 1.1 percent $Cl/Al_2O_3$, Pb/Pt = 1.0 (ratio by weight), and the amount of HCl added was 1.0 percent by weight based upon the weight of catalyst.

10 g of this catalyst was filled in a reactor having a diameter of 0.75 inch, and subjected to a pretreatment in the flow of hydrogen, at 950°F for 3 hours, followed by reforming of a naphtha having the below-mentioned properties. The reaction conditions were as follows: temperature, 930°F; pressure, 140 p.s.i.g.; LHSV, 4.0 $hr^{-1}$; and ratio of hydrogen: naphtha, 7.0 (by mol). The yield of the total aromatics thus obtained was as follows:

| Properties of naphtha | |
|---|---|
| Paraffins | 64.8% by vol. |
| Olefins | 0.4 |
| Naphthenes | 22.8 |
| Aromatics | 12.0 |
| Range of boiling point | 214 – 375°F |
| Specific gravity (20°C) | 0.756 |
| Research octane value (clear) | 38 |
| Results of reaction | |
| Yield of total aromatics (wt.%, average throughout 70 hours) | 66.4 |
| Rate of deactivation ($\alpha_{70}$) | $10.9 \times 10^{-4} hr^{-1}$ |

$$\alpha_t = \frac{1}{t} \log \frac{Y_o}{Y_t}$$

$Y_o$: Yield at the initial period of reaction
$Y_t$: Yield after t hours

Further, the research octane value (unleaded) of the reformate in the average throughout 70 hours was 108.

As compared with the below-mentioned Comparative Example 1, it can be seen that the yield of aromatics and the octane value are higher. Further, as compared with Comparative Examples 5 and 6, the rate of deactivation is smaller.

EXAMPLE 2

99 g of γ-alumina carrier was impregnated with 200 cc of an aqueous solution in which lead nitrate was used and the content of Pb was 0.25 percent by weight. After evaporation to dryness, calcination was carried out at 1020°F for 3 hours. The resulting mass was impregnated with 200 cc of an aqueous solution containing 0.25 percent by weight of Pt and 0.5 percent by weight of HCl. After evaporation to dryness, calcination was carried out at 1020°F for 3 hours. The composition of the catalyst thus obtained was 0.5 percent Pt - 0.5 percent $Pb/Al_2O_3$, Pb/Pt = 1.0, and the amount of HCl added was 1.0 percent by weight based on the weight of the catalyst. Reforming of naphtha was carried out using the catalyst in the same method and under the same reaction conditions as in Example 1. The yield of the total aromatics thus obtained was as follows:

| Results of reaction | |
|---|---|
| Yield of aromatics (wt.%, average throughout 70 hours) | 65.8 |
| Rate of deactivation ($\alpha_{70}$) | $8.5 \times 10^{-4} hr^{-1}$ |

EXAMPLE 3

A catalyst was prepared in the same way as in Example 2 except that the order of support of platinum and lead was reversed, and reforming of naphtha was carried out in the same method and under the same reaction conditions as in Example 2.

The yield of the total aromatics thus obtained was as follows:

| Results of reaction | |
|---|---|
| Yield of aromatics (wt.%, average throughout 70 hrs.) | 64.2 |
| Rate of deactivation | $8.8 \times 10^{-4}$ hr$^{-1}$ |

EXAMPLE 4

A catalyst was prepared under the same conditions as in Example 1 except that an aqueous solution in which the contents of platinum and lead were 0.15 percent by weight and 0.15 percent by weight, respectively, was used. The composition of the resulting catalyst was 0.3 percent Pt - 0.3 percent Pb - 0.8 percent Cl/Al$_2$O$_3$, Pb/Pt = 1.0. The amount of HCl added was 1.0 percent by weight based on the weight of the catalyst.

Reforming of naphtha was carried out using the catalyst in the same method and under the same reaction conditions as in Example 1.

The yield of aromatics thus obtained was as follows:

| Results of reaction | |
|---|---|
| Yield of aromatics (wt.%, average throughout 70 hrs.) | 64.0 |
| Rate of deactivation ($\alpha_{70}$) | $9.1 \times 10^{-4}$ hr$^{-1}$ |

As compared with Comparative Example 2, it can be seen that the yield of aromatics is higher and the rate of deactivation is smaller.

EXAMPLE 5

99 g of γ-alumina carrier was impregnated with 200 cc of an aqueous solution in which lead nitrate was used and the content of Pb was 0.15 percent by weight. After evaporation to dryness, calcination was carried out at 1020°F for 3 hours. Further, the resulting calcined product was impregnated with 200 cc of an aqueous solution containing 0.15 percent by weight of Pt and 3.0 percent by weight of HCl, and calcination was carried out at 1020°F for 3 hours. The composition of the resulting catalyst was 0.3 percent Pt - 0.3 percent Pb/Al$_2$O$_3$, Pb/Pt = 1.0, and the amount of HCl added was 6.0 percent by weight based on the weight of the catalyst.

Using this catalyst, reforming of naphtha was carried out in the same method and under the same reaction conditions as in Example 1. The following reaction results were obtained:

| Yield of aromatics (wt.%, average throughout 70 hrs.) | 65.2 |
|---|---|
| Rate of deactivation ($\alpha_{70}$) | $9.3 \times 10^{-4}$ hr$^{-1}$ |

EXAMPLE 6

A catalyst was prepared in the same way as in Example 5 except that the order of support of platinum and lead was reversed, and reforming of naphtha was carried out in the same method and under the same reaction conditions as in Example 5.

The yield of the total aromatics thus obtained was as follows:

| Results of reaction | |
|---|---|
| Yield of aromatics (wt.%, average throughout 70 hrs.) | 63.5 |
| Rate of deactivation ($\alpha_{70}$) | $6.4 \times 10^{-4}$ hr$^{-1}$ |

EXAMPLES 7 - 11

Using an aqueous solution in which the contents of Pt, Pb and HCl were 0.25 percent, 0.025 – 1.25 percent and 1.0 percent, each by weight, respectively, a catalyst was prepared in the same manner as in Example 1.

The composition of the resulting catalyst was 0.5 percent Pt - 0.05 to 2.5 percent Pb/Al$_2$O$_3$, Pb/Pt = 0.1 – 5.0, and the amount of HCl added was 2.0 percent by weight based on the weight of the catalyst.

20 g of the catalyst was put in a quartz glass reactor having an inner diameter of 18 mm, and subjected to a pretreatment in the current of hydrogen, at 950°F, for 3 hours.

An aromatizing reaction was carried out using n-heptane under the following conditions: temperature, 930°F; pressure, atmosphric pressure; LHSV, 0.5 hr$^{-1}$; and ratio of hydrogen: heptane, 3.0.

The yields of aromatics in average from the start of to 6 hours after the reaction were as follows:

| Example No. | Catalyst (wt.%) Pt | Pb | Pb/Pt | Yield of aromatics (wt.%) |
|---|---|---|---|---|
| 7 | 0.5 | 0.05 | 0.1 | 40.7 |
| 8 | 0.5 | 0.25 | 0.5 | 76.4 |
| 9 | 0.5 | 0.5 | 1.0 | 78.2 |
| 10 | 0.5 | 1.0 | 2.0 | 74.1 |
| 11 | 0.5 | 1.5 | 3.0 | 50.5 |
| Reference Example | 0.5 | 2.5 | 5.0 | 31.2 |

As compared with Comparative Examples 3 to 4, it can be seen that the yield of aromatics is higher.

EXAMPLE 12

A catalyst was prepared in the same manner as in Example 4 except that the solution contained 0.1 percent of cadmiun (cadmium nitrate was used). The composition of the resulting catalyst was 0.3 percent Pt - 0.3 percent Pb - 0.2 percent Cd/Al$_2$O$_3$, Pb/Pt = 1.0, and the amount of HCl added was 1 percent.

Using this catalyst, reforming of naphtha was carried out in the same method and under the same conditions as in Example 4. The yield of aromatics in average throughout 70 hrs. was 64.8 percent by weight.

EXAMPLE 13

98.5 g of γ-alumina was impregnated with 300 cc of an aqueous solution containing 0.46 percent by weight of cadmium nitrate, Cd(NO$_3$)$_2$·4H$_2$O. After evaporation to dryness, calcination was carried out at 930°F for 3 hours.

The total amount of the resulting γ-alumina carrier having cadmium supported thereon was impregnated with 200 cc of an aqueous solution in which chloroplatinic acid, lead nitrate and conc. hydrochloric acid (37 percent) were used and the contents of Pt, Pb and HCl were 0.25 percent, 0.25 percent and 0.5 percent, each by weight, respectively. After evaporation to dryness, calcination was carried out at 930°F for one hour.

The composition of the resulting catalyst was 0.5 percent Pt - 0.5 percent Pb - 0.5 percent Cd/Al$_2$O$_3$, Pb/Pt = 1.0 (by weight), and the amount of HCl added was 1.0 percent by weight based on the weight of the catalyst.

Using this catalyst, reforming was carried out in the same method and under the same conditions as in Example 1 except that the ratio of hydrogen: naphtha was 5.0. The reaction results were as follows:

| Reaction period (hr.) | 2 - 20 | 20 - 44 | 68 - 69 |
|---|---|---|---|
| Yield of aromatics (wt.%) | 71.6 | 70.2 | 68.3 |
| Rate of deactivation ($\alpha_{70}$) | | 4.2 × 10$^{-4}$ | |

In this Example, $\alpha_{70}$ is particularly small.

EXAMPLE 14

In this Example, dehydrogenation reaction of methylcyclohexane was carried out using
A. Catalyst of Example 1 (0.5 percent Pt - 0.5 percent Pb - 1.1 percent, Cl/Al$_2$O$_3$),
B. Catalyst of Comparative Example 1 (0.5 percent Pt - 0.5 percent Pb/Al$_2$O$_3$), and
C. Commercially available, conventional catalyst (0.6 percent Pt/Al$_2$O$_3$).

The reaction conditions were as follows: pressure, 140 p.s.i.g.; WHSV, 16 hr$^{-1}$; ratio of H$_2$: raw material, 5.0 (by mol); and reaction temperature, 930°F.

The yields percent by mol of toluene thus obtained were as follows:

| Catalyst \ Time (hrs.) | 10 | 80 | 160 | 250 | 300 |
|---|---|---|---|---|---|
| A (present invention) | 99.7 | 99.0 | 96.6 | 95.8 | 95.8 |
| B (prior invention) | 99.8 | 99.8 | 99.6 | 99.7 | 99.8 |
| C (conventional) | 99.6 | 96.1 | 93.5 | 92.3 | 90.6 |

So long as the dehydrogenating activity of naphthene, alone, is concerned, Catalyst B is superior to Catalyst A, which is, however, better than Catalyst C.

EXAMPLE 15

121 cc of an aqueous solution of lead nitrate (Pb(NO$_3$)$_2$) having a concentration of 0.02 mol/l was poured in 1 kg of an alumina sol (assay 10 wt. percent). The resulting mixture was heated on a water bath, followed by evaporation to dryness with stirring. After calcination of the alumina having lead support thereon at 930+C for 5 hours, the calcined mass was put in 259 cc of a mixed aqueous solution of chloroplatinic acid having a concentration of 0.01 mol/l and hydrogen chloride having a concentration of 0.05 mol/l, followed by evaporation to dryness in the same manner as mentioned above. Calcination was carried out at 1020°F for 3 hours.

The composition of the resulting catalyst was 0.5 percent Pt - 0.5 percent Pb - 1.24 percent Cl/Al$_2$O$_3$ and the ratio by weight of Pb/Pt was 1.0.

Ten grams of this catalyst was filled in a reactor having an inner diameter of three-fourths inch, and subjected to a pre-treatment in the stream of hydrogen, at 950°F for 3 hours, followed by reforming the same naphtha as in Example 1. The reaction conditions were as follows: temperature, 895°F; pressure, 200 p.s.i.g.; LHSV, 3.0 hr$^{-1}$; and ratio of hydrogen to naphtha, 7.0 (by mol).

The research octane values (unleaded) of the reformate in average were as follows:

| | Research Octane Value | | |
|---|---|---|---|
| Period (hr.) | 24 | 120 | 500 |
| Present invention (hydrogen chloride, used) | 98 | 105 | 103 |
| Comparative Example (hydrogen chloride, unused) | 99 | 103 | 98 |

Comparative Example 1

Example 1 was repeated except that no hydrochloric acid was used, and the following results were obtained:

| Yield of aromatics (wt.%, average throughout 70 hrs.) | 63.3 |
|---|---|
| Rate of deactivation ($\alpha_{70}$) | 10.5 × 10$^{-4}$ hr$^{-1}$ |

The research octane value in average throughout 70 hrs. (unleaded) was 106.

Comparative Example 2

Example 4 was repeated except that no hydrochloric acid was used, and the following results were obtained:

| Yield of aromatics (wt.%, average throughout 70 hrs.) | 61.9 |
|---|---|
| Rate of deactivation ($\alpha_{70}$) | 14.7 × 10$^{-4}$ hr$^{-1}$ |

Comparative Example 3

Example 9 was repeated except that no hydrochloric acid was used, and the following results were obtained:

| Yield of aromatics (wt.%, average throughout 70 hrs.) | 75.3 |
|---|---|
| Rate of deactivation ($\alpha_{70}$) | 3.5 × 10$^{-4}$ hr$^{-1}$ |

Comparative Example 4

A catalyst having a composition of 0.5 percent Pt/Al$_2$O$_3$ was prepared in the same manner as in Example 7 except that no lead and no hydrochloric acid were used, and reaction was carried out in the same manner as in Example 7.

| Yield of aromatics (wt.%, average throughout 70 hrs.) | 34.7 |
|---|---|
| Rate of deactivation ($\alpha_{70}$) | 38.7 × 10$^{-4}$ hr$^{-1}$ |

Comparative Example 5

100 g of the same carrier as in Example 1 was put in 200 cc of an aqueous solution containing 0.5 percent of hydrochloric acid. After evaporation to dryness, calcination was carried out at 1020°F, for 5 hours. Using the carrier having hydrochloric acid attached thereto, a catalyst was prepared in the same manner as in Example 1, and reaction was carried out in the same manner as in Example 1. The following results were obtained:

| | |
|---|---|
| Yield of aromatics (wt.%, average throughout 70 hrs.) | 57.1 |
| Rate of deactivation ($\alpha_{70}$) | $17.7 \times 10^{-4}$ hr$^{-1}$ |

Comparative Example 6

99g of γ-alumina carrier was impregnated with 200 cc of an aqueous solution containing 0.25 percent by weight of lead and 0.5 percent by weight of hydrochloric acid. After evaporation to dryness, calcination was carried out at 1020°F, for 3 hours. Further, the resulting product was impregnated with 200 cc of an aqueous solution containing 0.25 percent by weight of Pt. After evaporation to dyness, calcination was carried out at 1020°F, for 3 hours. The composition of the resulting catalyst was 0.5 percent Pt - 0.5 percent Pb/Al$_2$O$_3$. Using this catalyst, reaction was carried out in the same conditions as in Example 1, and the following results were obtained:

| | |
|---|---|
| Yield of aromatics (wt.%, average throughout 70 hrs.) | 56.8 |
| Rate of deactivation ($\alpha_{70}$) | $23.5 \times 10^{-4}$ hr$^{-1}$ |

Comparative Examples 7 - 9

A catalyst was prepared in the same manner as in Example 1 except that nitric acid, ammonium chloride and hydrogen fluoride were used in place of hydrochloric acid, and reforming of naphtha was carried out in the same method and under the same conditions as in Example 1.

The following results were obtained:

| Comparative Example No. | Substance added | Yield of aromatics (wt.%, average throughout 70 hrs.) | Rate of deactivation ($\alpha_{70}$) |
|---|---|---|---|
| 7 | nitric acid | 42.0 | 37.4 |
| 8 | ammonium chloride | 57.0 | 10.6 |
| 9 | hydrogen fluoride | 51.0 | 17.6 |

As shown in the above-mentioned Examples and Comparative Examples, it can be seen that according to the present invention, improvements in the octane value and the yield of aromatics are effected, and hydrochloric acid imparts a particular effectiveness upon the active species of the Pt - Pb system. Through these effectiveness, a cheap process for producing gasoline base stocks and aromatics can be brought about.

What is claimed is:

1. In the method for reforming hydrocarbons with a catalyst comprising a platinum component, a lead component and a third component all supported on a carrier, an improvement which comprises contacting hydrocarbons with a catalyst prepared by the steps which comprise compositing with a carrier in any order a platinum component, a lead component and a third component, the incorporation of said platinum component being carried out with a hydrochloric acid solution of a platinum component containing 0.1 - 10 percent by weight of hydrogen chloride based on the weight of the catalyst, and calcining the carrier supporting the platinum component, the lead component and the third component at a temperature of 570 - 1470°F to give a catalyst composition of 0.1 - 3 percent by weight chlorine, 0.01 - 2 percent by weight of platinum, 0.01 - 5 percent by weight of lead and 0.01 - 5 percent by weight of the third component metal, based on the weight of the catalyst, the weight ratio of lead to platinum being in the range of 0.1- 3:1, and the third component metal being selected from the group consisting of zinc, cadmium and mercury the hydrocarbon being admixed with hydrogen in a mole ratio of 0.5 –15 moles of hydrogen per mole of hydrocarbon and contacted with the catalyst at an LHSV in the range of 0.2 - 10 hr$^{-1}$ and the reforming reaction being carried out at a temperature of 600°F to 1200°F at a pressure in the range of 0 - 700 psig.

2. An improvement according to claim 1, wherein said steps comprising compositing with a carrier at first a third component by impregnating a carrier with a solution of a compound corresponding to the third component, then compositing with the carrier supporting the third component a platinum component and a lead component by impregnating the carrier with a hydrochloric acid solution of a platinum compound containing 0.1 - 10 percent by weight of hydrogen chloride based on the weight of the catalyst and a solution of a lead compound, and calcining the impregnated carrier.

3. An improvement according to claim 1, wherein said steps comprise compositing with a carrier simultaneously a platinum component, a lead component and a third compound by impregnating a carrier with a hydrochloric acid solution of a platinum compound, a lead compound and a compound corresponding to the third component containing 0.1 - 10 percent by weight of hydrogen chloride based on the weight of the catalyst, and calcining the impregnated carrier.

4. An improvement according to claim 1, wherein said platinum component is a halogen-containing platinum component.

5. An improvement according to claim 1, wherein the amount of said hydrogen chloride is 0.5 - 5 percent by weight based on the weight of the catalyst.

6. An improvement according to claim 1, wherein said carrier is selected from the group consisting of alumina, silica, silica-alumina and zeolite.

7. An improvement according to claim 1, wherein the period of time for said calcination is in the range of 30 minutes to 10 hours.

8. An improvement according to claim 1, wherein said hydrocarbons are selected from the group consisting of naphtha, kerosene and gas oil.

9. An improvement according to claim 1, wherein said reforming is carried out under a pressure of 0 - 300 p.s.i.g.

10. An improvement according to claim 1, wherein said steps comprise compositing with a carrier at first a third component by co-precipitating a compound corresponding to the third component and a compound corresponding to the carrier, and calcining them, then impregnating the carrier supporting the third component with a hydrochloric acid solution of a platinum compound containing 0.1 - 10 percent by weight of hydrogen chloride based on the weight of the catalyst and a solution of a lead compound to give a catalyst composition of 0.01 – 2 percent by weight of platinum, 0.01 – 5 percent by weight of lead and 0.01 – 5 percent by weight of the third component metal, based upon the weight of catalyst, the weight ratio of lead to platinum being in the range of 0.1 – 3:1.

11. An improvement according to claim 1, wherein said steps comprise compositing with a carrier at first a third component by co-gelating a compound corresponding to the third component and a compound corresponding to the carrier, and calcining them, then impregnating the carrier supporting the third component with a hydrochloric acid solution of a platinum compound containing 0.1 – 10 percent by weight of hydrogen chloride based on the weight of the catalyst and a solution of a lead compound to give a catalyst composition of 0.01 – 2 percent by weight of platinum, 0.01 – 5 percent by weight of lead and 0.01 – 5 percent by weight of the third component metal, based upon the weight of catalyst, the weight ratio of lead to platinum being in the range of 0.1 – 3:1.

12. The method of claim 1 wherein said third component metal is cadmium.

13. A catalyst for reforming hydrocarbons comprising 0.01 – 2 percent by weight of platinum, 0.01 – 5 percent by weight of lead, 0.1 – 5 percent by weight of a third component metal selected from the group comprising zinc, cadmium and mercury, and 0.1 – 3 percent by weight of chlorine all supported on a carrier, the weight ratio of lead to platinum being in the range of 0.1 – 3:1 and obtained by calcining the carrier supporting the catalytic components at 570°F – 1470°F, the platinum being supported on the carrier by impregnation with a hydrochloric acid solution of a platinum compound and the distribution of platinum and lead within the catalyst being in accordance with the X-ray spectrum pattern shown in FIG. 2 of the drawings.

14. The catalyst of claim 13 wherein said third component metal is cadmium.

* * * * *